Sept. 25, 1934.    R. E. FLANDERS    1,975,060
GEAR SELECTING AND SHIFTING MECHANISM
Filed June 15, 1933    4 Sheets-Sheet 1

Inventor
Ralph E. Flanders
by Wright Brown Quinby & May
Attys

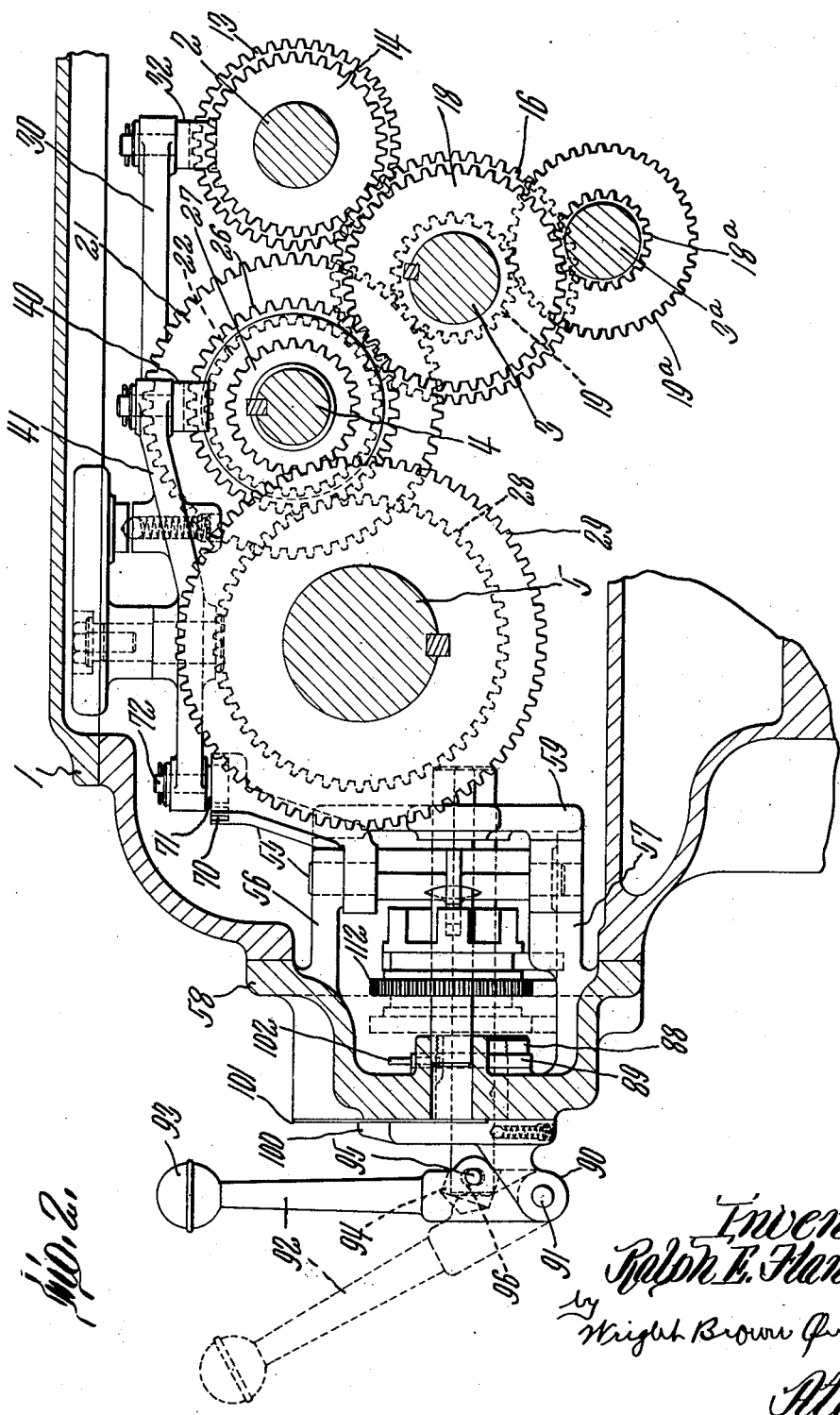

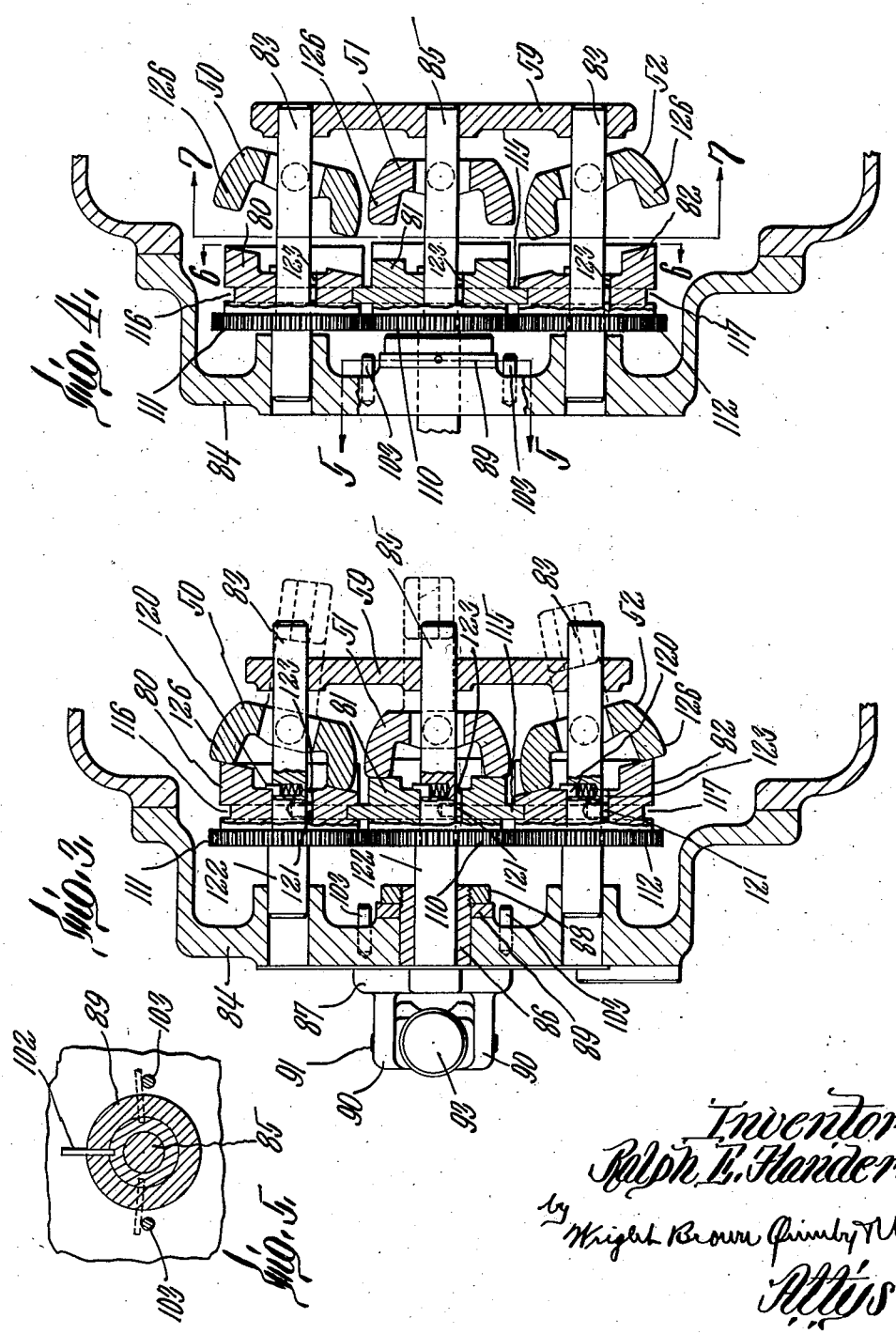

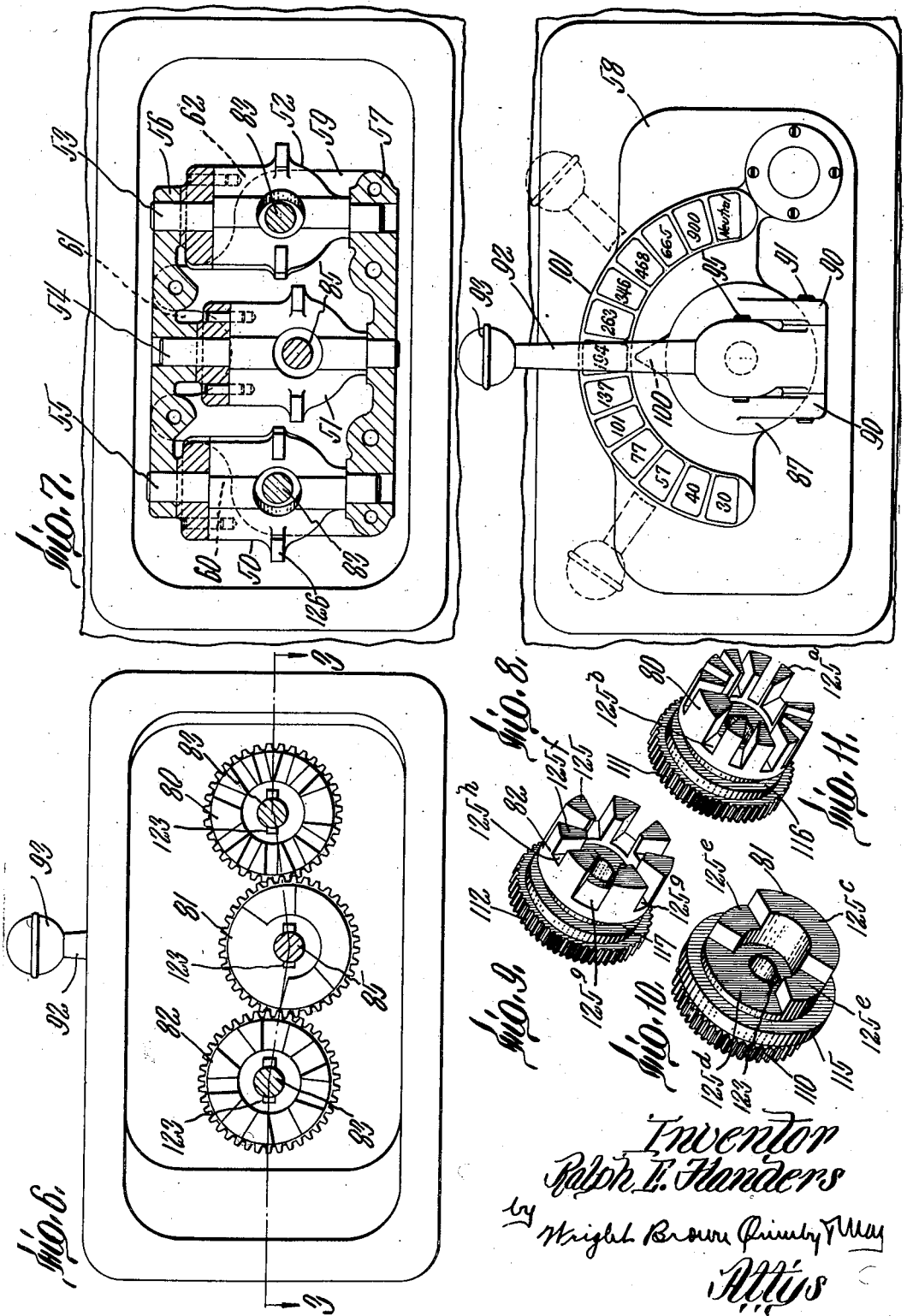

Patented Sept. 25, 1934

1,975,060

UNITED STATES PATENT OFFICE 1,975,060

GEAR SELECTING AND SHIFTING MECHANISM

Ralph E. Flanders, Springfield, Vt., assignor to Jones & Lamson Machine Company, Springfield, Vt., a corporation of Vermont Application June 15, 1933, Serial No. 675,887

9 Claims. (Cl. 74—334)

This invention relates to gear selecting and shifting mechanism in which a very considerable number of gear ratios may be obtained readily without requiring removal and replacement of gears and by which the particular ratio desired may be obtained expeditiously and without requiring computation or the use of gear tables. To this end a series of selectively meshing gears, are employed, together with selecting mechanisms therefor, and a common controller and actuator for the mechanisms by which they are automatically set in proper relation one to another to produce the desired results by merely manipulating a handle in accordance with a dial on which is indicated the various speeds which may be obtained. Besides controlling the intermeshing of the various gears the selector mechanism may also control other actions such as starting and stopping or reversing the driven mechanism.

One of the objects of this invention is to simplify the selector mechanism and to increase the possible number of speed changes without materially increasing the complications of the apparatus.

For a more complete understanding of this invention, reference may be had to the accompanying drawings, in which,—

Figure 2 is a section on line 2—2 of Figure 1.

Figure 3 is a detail section on line 3—3 of Figure 6, the parts being shown in a gear selected position.

Figure 4 is a view similar to Figure 3, but showing the parts in position to permit a change of selection.

Figures 5, 6 and 7 are detail sections on correspondingly numbered section lines of Figure 4.

Figure 8 is a front elevation of the selector control mechanism.

Figures 9, 10 and 11 are perspectives of three selectors.

Figure 1:
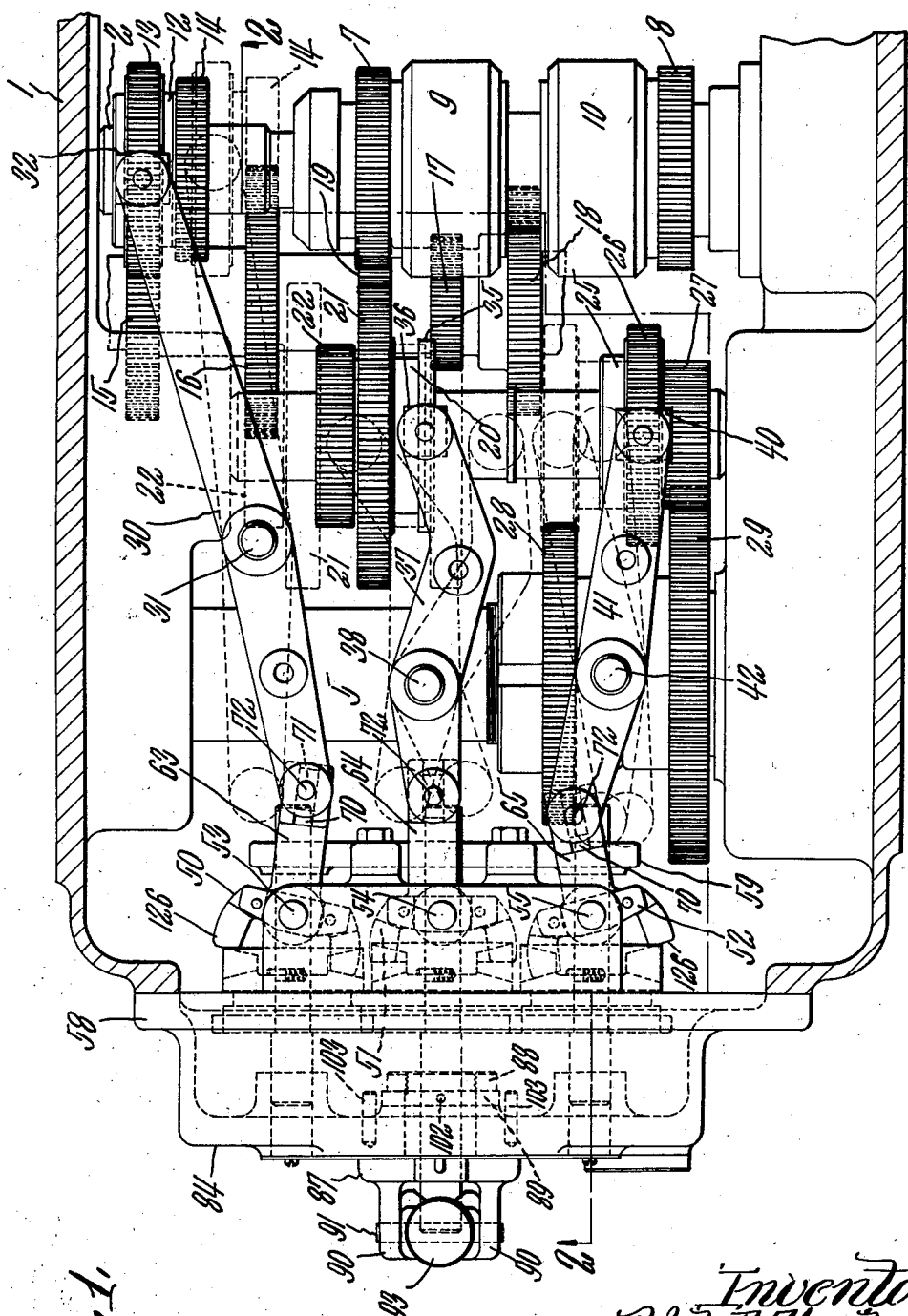
Figure 1 is a plan view, the gear casing being shown in section, of an embodiment of the invention.

Referring first to Figures 1 and 2, at 1 is indicated a frame of any suitable type within which are journalled shafts such as 2, 3, 3a, 4, and 5. The shaft 5 may be, for example, the drive spindle of a lathe or other machine tool, the speed of which it is desired to selectively control. Loosely mounted on the shaft 1 are shown a pair of gears 7 and 8 which are arranged to be driven in opposite directions by any suitable gears (not shown) meshing therewith. At 9 and 10 are conventionally indicated clutch devices by actuation of which either selected gear 7 or 8 may be coupled to the shaft 2 to rotate this shaft in the desired direction. The shaft 2 has slidably keyed thereto a sleeve 12 having gear portions 13 and 14 thereon of different diameters. This sleeve 12 may be moved axially so that the gear 13 may mesh with the gear 15 secured to the shaft 3 or the gear 14 may be meshed with the gear 16 also secured to the shaft 3, thus to drive the shaft 3 from the shaft 2 at either of two somewhat different speeds. The shaft 3 also has loose thereon but secured together gears 17 and 18 and a gear 19 of the same size as the gear 17 is fixed on the shaft 3.

The shaft 4 has slidably keyed thereto a sleeve 20 to which is fixed the gears 21 and 22. By sliding the sleeve 20 to its extreme left hand position the gear 22 is brought into mesh with the gear 16 on the shaft 3. In the intermediate position of the sleeve 20 shown in Figure 1 the gear 21 is in mesh with the gear 19 fixed on the shaft 3, and in the extreme right hand position of the sleeve 20 the gear 21 is in mesh with the gear 17 journalled on the shaft 3. A gear 19a fixed to the shaft 3a (see Figure 2) is in mesh with the gear 19 so as to be driven by the shaft 3, and a gear 18a fixed to this shaft 3a is in mesh with the gear 18. These gears 18, 18a and 19, 19a are of such relative sizes that the gear 17 while of the same size as the gear 19 is driven at a somewhat lower speed. Thus, the shaft 4 may be driven at two different speed ratios relative to the shaft 3 from the gears 16 and 19 thereon and at a still different ratio from the gear 17 and this shaft 3 in turn may be driven at either of two speed ratios from the shaft 2. The shaft 4 also carries slidably keyed thereto a sleeve 25 to which are fixed the gears 26 and 27 of different diameters. In the extreme left hand position of the sleeve 25 the gear 26 meshes with a gear 28 fixed to the shaft 5 and in the extreme right hand position, as shown in Figure 1, the gear 27 meshes with the gear 29 also fixed to the shaft 5, while in an intermediate position of the sleeve 25 both the gears 26 and 27 are out of mesh with the corresponding gears on the shaft 5, this intermediate position being a neutral position where the shaft 5 is not rotated.

The position of the sleeve 12 on the shaft 2 is determined by the angular position of a lever 30 fulcrumed at 31 to the frame 1 and carrying at one end a forked guiding shoe 32 which is formed to straddle the gear 13. The sleeve 20 is shown as provided with a rim 35 which is similarly straddled by a shoe 36 pivoted to one end of a lever 37 fulcrumed at 38 to a suitable part of the machine frame. The sleeve 25 is arranged to be moved by movement of a shoe 40 which straddles the gear 26 and which is pivotally carried at one end of a lever 41 fulcrumed at 42 to a suitable part of the machine frame. These three levers and the sleeves controlled thereby constitute the shift devices by which the speed ratio of the shaft 5 to the driving shaft 2 is determined, it being evident from the various possible drive combinations that a large number of different speed ratios are possible, there being twelve driving combinations of the shift devices and a neutral position where the shaft 5 is not driven. Mechanisms for selectively moving and controlling the shift devices will now be described.

Each of the shift devices is controlled and moved by a rocker, these rockers being shown at 50, 51 and 52. These rockers are journalled on pivots 53, 54, and 55 respectively in the upper and lower plates 56 and 27 forming a portion of the casing 1, and as shown integral with a cap 58 for this casing. The inner ends of the plates 56 and 57 are shown as closed off by a guide plate 59 which has its upper portion cut away as at 60, 61 and 62 (see Figure 7) in order to permit the shank portions 63, 64 and 65 of the rockers 50, 51 and 52 to pass therethrough so that their inner ends may be coupled to the levers 30, 37 and 41 respectively. As shown in Figure 2, each of these arms is provided with a slotted way such as 70 at its outer end within which rides a block 71 carried by a pivot 72 journalled in the end of the mating lever. Thus, by rocking the rockers 50, 51 and 52 the corresponding shift devices may be caused to move to change the gear ratios between the several shafts. The angular positions of these rockers are changed and controlled by selectors, there being one selector for each rocker, these selectors being shown at 80, 81 and 82. The selectors 80 and 82 are each shown as carried by a shaft 83 which is slidably and rockably mounted in the end portion 84 of the frame cap 58, and also in the plate 59. The selector 81 is shown as similarly mounted on a shaft 85 also slidably and rockably mounted in the plates 84 and 59, but the shaft 85 is longer than the shafts 83 and extends out into a hub member 86 of a bushing 87 journalled in the portion 84 and held against axial motion by a nut 88 threaded on the inner end of the hub member and bearing against a washer 89 which in turn bears against the inner face of the frame portion 84. The bushing 87 is provided with a pair of outwardly extended ears 90 between which is fulcrumed at 91 a hand lever 92 which is preferably provided with a knob 93 at its outer end. The outer end of the shaft 85 extends into a recess 94 in this lever and is pivoted thereto as by the pin 95 which passes through a slot 96 in one of these parts so as to permit rocking of the lever between the full and dotted line positions shown in Figure 2, thus producing axial motion of the shaft 85. By moving the lever 92 about the axis of the bushing 87 as a center this bushing is thereby rocked and the shaft 85 together with its selector 81 is also rocked. A pin 102 fixed to the washer 89 which turns with the shaft 85 cooperates with fixed pins 103 (see Figures 3 and 5) to limit the extent of angular motion of the shaft 85. The bushing 87 is preferably provided with a pointer 100 which cooperates with a scale 101 secured to the outer face of the cap member 84 and which has marked thereon indications of the speed normally imparted to the shaft or spindle 5 when the gears 7 and 8 are driven at their normal speed.

The selector 81 is provided with a gear portion 110 which meshes with similar gear portions 111 and 112 on the selectors 80 and 82, respectively, thus to ensure simultaneous rotation of all the selectors when the handle 93 is rocked to turn the bushing 87. These selectors are also coupled for simultaneous axial motion throughout their entire range of such motion, to this end the selector 81 being shown as provided with a circumferential rib 115 which engages in mating circumferential grooves 116 and 117 in the selectors 80 and 82. Each of these selectors is shown as held on its respective shaft by means of a spring-pressed plug 120, each selector being held thereby against an enlarged diameter portion of its respective shaft at 122 and at least the selector 81 being keyed to its shaft as by a pin 121 carried by the shaft engaging in a keyway 123 in the selector. By pressing inwardly on any of the plugs 120 the corresponding selector may be released from its shaft so that another selector having different arrangements of selector faces may be substituted therefor if desired. These selectors 80, 81 and 82 are shown in perspective in Figures 11, 10 and 9, respectively. Each is provided with a plurality of outwardly directed segmental faces 125 at different elevations arranged in diametrical pairs in such a manner that when the selectors are moved toward the rockers one pair of faces of each selector bears against end faces 126 on forked extremities of its mating rocker so that each rocker is controlled to take a definite angular position, these positions depending on the angular positions of the selectors when these selectors are moved thereagainst. Since the shaft device including the gears 13 and 14 of the shaft 2 has two positions only, the selector 80 has its faces 125 arranged at two elevations only, each high face 125a being arranged opposite to a depressed face 125b diametrically opposite thereto so that when the selector 80 is moved into its rocker-engaging position it forces this rocker to take one or the other of its two operative positions. The shift mechanism including the sleeve 20 on the shaft 4 has three positions so that the faces of the selector 81 which engage with the rocker 51 are arranged at three elevations as shown in Figure 10 the highest 125c being opposite to the lowest 125d and there being intermediate elevation faces 125e positioned to hold the rocker 51 in its mid position as shown in Figure 3 when these selector faces engage the rocker. The selector 82 is also provided with rocker engaging faces at three different elevations, there being the extreme elevation faces 125f, the low faces 125g and the faces 125h of intermediate elevation. These arrangements of selector faces are so related to each other that at any registering position of the handle 92 with relation to the scale 101 the selector faces are so presented in angular relation to their respective rockers that by rocking the handle 92 inwardly so as to press the selectors toward their respective rockers these rockers are caused to take such relative positions as to produce the speed of rotation of the driven shaft or spindle 5 indicated on the dial 101 with normal speed of the gears 7 and 8.

It will be noted from inspection of Figure 8 that one of these dial markings is neutral. In this position of the lever the selector 82 holds the shift device including the sleeve 25 in its intermediate neutral position where its gears are both out of engagement with the gears on the shaft or spindle 5 so that no matter what the setting of the other selectors is there is no rotation imparted to this shaft 5. This neutral or disconnection is made between the shafts 4 and 5 in order that while this shaft is uncoupled from the drive mechanism the other gears with their shafts continue to rotate and thus keep a continuous supply of lubricating oil therefor, it being intended that the gear casing shall contain an oil bath for the various shafts and gears.

From the foregoing description of an embodiment of this invention, it should be evident to those skilled in the art that various changes and modifications might be made therein without departing from the spirit or scope of this invention as defined by the appended claims.

I claim:

1. A mechanism of the class described comprising a plurality of shift devices, a movable member for actuating and controlling each of said devices, a rotary selector for each member having a selector face, each member having a face for engagement with a face of its corresponding selector to determine the position of said member, said selectors having inter-engaging portions insuring simultaneous rocking and simultaneous axial motions thereof, and means actuable to turn said selectors in unison and to move said selectors and members relatively axially of said selectors into and out of engagement with each other.

2. A mechanism of the class described comprising a plurality of shift devices, a rocker for controlling and actuating each of said devices, a rotary and axially movable selector for each rocker, said selectors having means for ensuring simultaneous rocking and axial motions thereof throughout their full ranges of motion, each rocker having a face for engagement with a mating face of its corresponding selector to determine the angular position of said rocker, and means actuable to turn one of said selectors and to move said selector axially to thereby turn and move all of said selectors into and out of engagement with their respective rockers.

3. A mechanism of the class described comprising a plurality of shift devices, a rocker for controlling and actuating each of said devices, a rotary and axially movable selector for each rocker, said selectors having their axes arranged in parallel relation and interengaging for simultaneous rocking and axial motions, each rocker having a face for engagement with a mating face of its corresponding selector when said selector is in one axial position to determine the angular position of its rocker, and means actuable to turn one of said selectors when in axial position out of engagement with the face of its rocker and then to move said selector into engagement with said rocker.

4. A mechanism of the class described comprising a plurality of shift devices, a rocker for controlling and actuating each of said devices, a rotary and axially movable selector for each rocker, said selectors having means for ensuring simultaneous rocking and axial motions thereof, each rocker having a pair of spaced feet for engagement with spaced mating faces of its corresponding selector to determine the angular position of said rocker, and means actuable to turn one of said selectors and to move said selector axially to thereby turn each of said selectors and move each selector axially into and out of engagement with the feet of its respective rocker.

5. A mechanism of the class described comprising a plurality of shift devices, a rocker for controlling and actuating each of said devices having a pair of spaced feet, a rotary and axially movable selector for each of said devices having an end face provided with segmental portions for engagement in pairs with the ends of said feet and determining by the relative elevations of said pair of face portions the angular position of the cooperating rocker when said selector is in one axial position, said selectors having inter-engaging means for insuring simultaneous and equal axial motions thereof and means for rotating said selectors and for moving said selectors axially to bring them into and out of controlling relation to their respective rockers.

6. A mechanism of the class described comprising a plurality of shift devices, a movable member for actuating and controlling each device, an axially movable rotary selector for each member having a face for engagement with a face of its member and when in such engagement determining the position of said member, means connecting said selectors for simultaneous rotation and axial movement, an element journalled for rotation and axially stationary, a lever pivoted to said element for movement in a plane lengthwise of said selector axes, and connections from said lever to one of said selectors for causing axial movement of said selectors into and out of engagement with their respective members on movement of said lever about its pivotal connection to said element and for rotating said selectors by movement of said lever in directions to rotate said element.

7. A mechanism of the class described comprising a frame, a plurality of shafts journalled in said frame, shiftable gearing for connecting said shafts, rockers for controlling and shifting said gearing, a rotary selector movable axially from and toward its rocker and when in contact therewith determining its angular position, said selectors having rocker engaging faces selectively presentable to said rockers in accordance with the angular positions of said selectors, an element rotatably carried on said frame, means for retaining said element against axial motion relative to said frame, a lever pivoted to said element for motion in a plane axially thereof, and connections from said lever to said selectors producing axial motion of said selectors toward and from said rockers on movement of said lever about its pivot and angular motion of said selectors when said lever is moved to turn said element.

8. A mechanism of the class described comprising a frame, a plurality of shafts journalled in said frame, shiftable gearing for connecting said shafts, rockers for shifting and controlling said gearing, a control shaft rockably and axially movable in said frame, a selector for each rocker movable axially into and out of rocker moving and controlling position and rockable about its axis to bring related portions thereof into position for controlling its rocker when it is subsequently moved axially, means actuable selectively to rock or axially move said control shaft, and connections for simultaneously actuating said selectors from motion of said control shaft.

9. A mechanism of the class described comprising a frame, a plurality of shafts journalled in said frame, shiftable gearing for connecting said shafts, rockers for shifting and controlling said gearing, a rotary selector for each rocker, each selector having segmental faces for engagement selectively in accordance with the angular and axial position of said selector with its respective rocker, said selectors having intermeshing teeth for ensuring simultaneous rotation thereof and intermeshing tongue and groove portions ensuring simultaneous axial motion thereof, a rockable and axially movable shaft carrying one of said selectors, an element rockably carried by said frame and held against axial movement relative thereto, and a lever fulcrumed on said element to move in the plane of said rock shaft and having a pivotal connection to said rock shaft.

RALPH E. FLANDERS.